(12) United States Patent
Uga (10) Patent No.: US 12,229,455 B2
(45) Date of Patent: Feb. 18, 2025

(54) IMAGE FORMING APPARATUS AND IMAGE FORMING METHOD FOR MAINTENANCE NOTIFICATION

(71) Applicant: Konica Minolta, Inc., Tokyo (JP)

(72) Inventor: Hiroshi Uga, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/307,314

(22) Filed: Apr. 26, 2023

(65) Prior Publication Data

US 2024/0020067 A1     Jan. 18, 2024

(30) Foreign Application Priority Data

May 6, 2022 (JP) ................................. 2022-076516

(51) Int. Cl.
*G06F 3/12* (2006.01)

(52) U.S. Cl.
CPC ............ *G06F 3/121* (2013.01); *G06F 3/1203* (2013.01); *G06F 3/1234* (2013.01); *G06F 3/1285* (2013.01)

(58) Field of Classification Search
CPC ...... G06F 3/121; G06F 3/1203; G06F 3/1234; G06F 3/1261
See application file for complete search history.

(56) References Cited

U.S. PATENT DOCUMENTS

| | | | | |
|---|---|---|---|---|
| 2010/0238479 A1* | 9/2010 | Yamazaki | ............... | G06F 3/121 358/1.14 |
| 2012/0013935 A1* | 1/2012 | Adachi | .................. | B41J 2/2135 358/1.14 |
| 2012/0200890 A1* | 8/2012 | Okumura | ............. | G03G 15/502 358/1.15 |
| 2013/0003119 A1* | 1/2013 | Yamaguchi | ........... | G06F 3/1234 358/1.15 |
| 2013/0148160 A1* | 6/2013 | Morimoto | ............... | G06F 3/121 358/1.15 |
| 2019/0268483 A1* | 8/2019 | Sakashita | ........... | H04N 1/00405 |
| 2019/0286387 A1* | 9/2019 | Wong | ...................... | G06F 3/121 |
| 2020/0393998 A1* | 12/2020 | Su | ........................ | G06F 3/1234 |

(Continued)

FOREIGN PATENT DOCUMENTS

| | | |
|---|---|---|
| JP | 2001-202224 | 7/2001 |
| JP | 2019-177525 | 10/2019 |

OTHER PUBLICATIONS

English Machine Translation of JP 3610323 B2-A (Hoku, Published Jan. 12, 2005) (Year: 2005).*

(Continued)

*Primary Examiner* — Juan M Guillermety
(74) *Attorney, Agent, or Firm* — BakerHostetler (57) ABSTRACT

An image forming apparatus includes: an image former that forms a print image; a first hardware processor that detects a defect of an image formed on a print medium by the image former; a display capable of prompting a user to perform maintenance; a communication I/F part capable of notifying an administrator or a person in charge of maintenance of an instruction of maintenance via a communication line; a second hardware processor capable of giving an instruction to the display and the communication I/F part; and a third hardware processor capable of instructing the second hardware processor on a defect notification destination.

17 Claims, 7 Drawing Sheets

(56) References Cited

U.S. PATENT DOCUMENTS

2021/0042065 A1\* 2/2021 Yamamoto .............. G06F 3/121
2022/0107860 A1\* 4/2022 Aizawa ............... G06F 11/3476

OTHER PUBLICATIONS

English Machine Translation of JP 2006-013814 A (Imayoshi et al., Published Jan. 12, 2006) (Year: 2006).\*
Machine translated document of Kitamura et al. (WO 20170022602 A, Published Feb. 9, 2017) (Year: 2017).\*

\* cited by examiner

| DEGREE OF DEFECTIVE IMAGE | NOTIFICATION DESTINATION |
|---|---|
| SLIGHT | USER |
| FIRST MEDIUM LEVEL | USER OR PERSON IN CHARGE OF MAINTENANCE |
| SECOND MEDIUM LEVEL | PERSON IN CHARGE OF MAINTENANCE |
| ⋮ | ⋮ |
| SEVERE | PERSON IN CHARGE OF MAINTENANCE AND ADMINISTRATOR |

| DEFECT CONTENTS | NOTIFICATION DESTINATION |
|---|---|
| SLIGHT DIRT ADHERING | USER |
| MEDIUM-LEVEL DIRT ADHERING | USER OR PERSON IN CHARGE OF MAINTENANCE |
| SEVERE DIRT ADHERING | PERSON IN CHARGE OF MAINTENANCE AND ADMINISTRATOR |
| ⋮ | ⋮ |
| PIXEL MISSING | PERSON IN CHARGE OF MAINTENANCE |
| ⋮ | ⋮ |
| ABNORMAL COLOR | PERSON IN CHARGE OF MAINTENANCE |
| ⋮ | ⋮ |

IMAGE FORMING APPARATUS AND IMAGE FORMING METHOD FOR MAINTENANCE NOTIFICATION

CROSS-REFERENCE TO RELATED APPLICATIONS

This application claims priority to Japanese Patent Application No. 2022-076516, filed on May 6, 2022, the entire disclosure of which is incorporated herein by reference in its entirety.

BACKGROUND

Technological Field

The present invention relates to an image forming apparatus and an image forming method.

Description of the Related Art

With the spread of computers, image forming apparatuses such as multifunction printers (MFPs) are used in many places. The image forming apparatuses are used for a period in units of years, but image defects occur due to continuous use for a long period of time. Examples of the image defects include occurrence of paper wrinkles, occurrence of inclination of a print image, and occurrence of noise such as a streak.

Accompanying the complication of the image forming apparatuses, such image defects are solved by cleaning and/or repairing by a person in charge of maintenance who receives contact from a user (see, for example, JP 2001-202224 A and JP 2019-177525 A).

JP 2001-202224 A describes an image forming apparatus management system for enabling a service person (person in charge of maintenance) to perform an operation economically and efficiently when an abnormality occurs in an image forming apparatus at a customer destination. The image forming apparatus management system includes a firmware version information reader that reads information indicating a firmware version of the image forming apparatus on a portable computer carried by a service person, and a firmware version output unit that displays the read information, forms an image on a sheet, or outputs the read information by voice. The technology described in JP 2001-202224 A is on the premise that a server and a person in charge of maintenance (service person) are notified when an image defect occurs.

Further, J P 2019-177525 A describes a technology of predicting a maintenance execution timing from an image defect occurring in normal use of the image forming apparatus, and performing notification of information prompting execution of maintenance when the number of times of occurrence of the image defect exceeds a tolerable number of times of occurrence of the image defect in order to optimize the timing. The technology described in JP 2019-177525 A notifies a user of a timing at which a maintenance action is required from the image defect.

However, due to the influence of the recent spread of the novel coronavirus (COVID-19), there are cases where the image forming apparatus is left unattended without maintenance due to limitation of attendance of staffs at a workplace of a user. Accordingly, the conventional technologies described in JP 2001-202224 A and JP 2019-177525 A have the following problems when giving a notification of maintenance.

First, it is assumed a case where only notification to a person in charge of maintenance (service person) is performed. Due to the influence of the outbreak of the new coronavirus, a person in charge of maintenance may not be able to come to the workplace of the user where the image forming apparatus is installed, and the frequency of cleaning of the image forming apparatus by the person in charge of maintenance may decrease. As a result, the user may execute the print job without noticing the occurrence of the image defect, and thus the defective image may be output, thereby deteriorating the reliability of the user to the image forming apparatus. In addition, depending on the content of the image defect, it may be better to notify the person in charge of maintenance only of the image defect having high importance. That is, it is sometimes desired that the image forming apparatus determines whether or not to notify the person in charge of maintenance as necessary, and does not notify the person in charge of maintenance of an image defect that the user does not care much.

Secondly, it is assumed a case where a notification to a user is performed. Accompanying the complication of the image forming apparatuses, the user needs to receive a notification with a high difficulty every time, and thus it may be desirable not to notify the user except in an emergency. In addition, depending on the user or the job content, the image defect may be tolerable dirt, and the user may be annoyed by the notification each time. Accordingly, it is sometimes desired that the image forming apparatus determines whether or not to notify the user as necessary, and does not notify the user of an image defect that the user does not care much.

SUMMARY

The present invention has been made in view of the above-described problems of the conventional technologies, and an object of the present invention is to provide an image forming apparatus and an image forming method capable of suitably giving a notification about maintenance.

To achieve the abovementioned object, according to an aspect of the present invention, an image forming apparatus reflecting one aspect of the present invention comprises: an image former that forms a print image; a first hardware processor that detects a defect of an image formed on a print medium by the image former; a display capable of prompting a user to perform maintenance; a communication I/F part capable of notifying an administrator or a person in charge of maintenance of an instruction of maintenance via a communication line; a second hardware processor capable of giving an instruction to the display and the communication I/F part; and a third hardware processor capable of instructing the second hardware processor on a defect notification destination.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments. Note that the drawings are only schematically illustrated to the extent that the present invention can be sufficiently understood. Therefore, the present invention is not limited only to illustrated examples. Further, in the drawings, the same reference numerals are given to common components and similar components, and redundant description thereof will be omitted.

<Configuration of Image Forming Apparatus>

Figure 1:
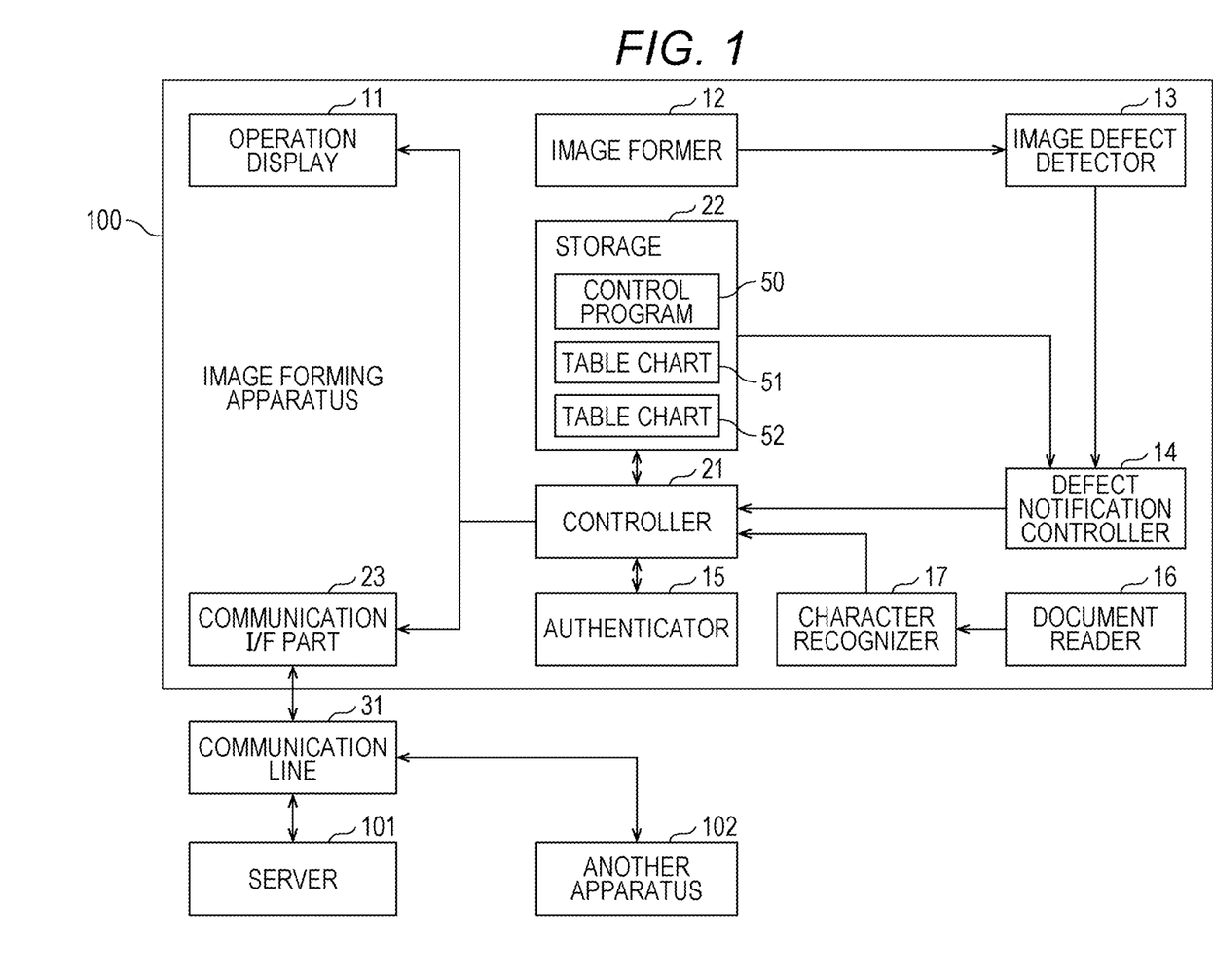
FIG. 1 is a block diagram illustrating a configuration of an image forming apparatus according to an embodiment.

Hereinafter, a configuration of an image forming apparatus 100 according to an embodiment of the present invention (hereinafter referred to as "the present embodiment") will be described with reference to FIG. 1. FIG. 1 is a block diagram illustrating a configuration of the image forming apparatus 100 according to the present embodiment.

The image forming apparatus 100 can perform control to switch the notification about maintenance to either (1) a server and a person in charge of maintenance or (2) a user according to a predetermined condition.

As illustrated in FIG. 1, the image forming apparatus 100 according to the present embodiment includes an operation display 11, an image former 12, an image defect detector 13, a defect notification controller 14, an authenticator 15, a document reader 16, a character recognizer 17, a controller 21, a storage 22, and a communication I/F part 23.

The operation display 11 is a unit that inputs and displays various types of information. The operation display 11 includes a display with a touch panel or the like in which an input function is added to a display. The operation display 11 can prompt the user to perform maintenance.

The image former 12 is a unit that forms a print image on a print medium.

The image defect detector 13 is a unit that detects a defect of an image formed on the print medium by the image former 12.

The defect notification controller 14 is a unit that controls defect notification. The defect notification controller 14 can instruct the controller 21 on a defect notification destination.

The authenticator 15 is a unit that authenticates the user of the image forming apparatus 100. The authenticator 15 acquires user information by a reader such as an IC card reader or a magnetic card reader and compares the acquired user information with registered user information registered in advance to authenticate the user.

The document reader 16 is a unit that reads an image of a document. The document reader 16 includes a scanner.

The character recognizer 17 is a unit that recognizes characters included in an image of a document read by the document reader 16.

The controller 21 is a unit that controls the operation of each unit of the image forming apparatus 100. The controller 21 can instruct the operation display 11 and the communication I/F part 23. The storage 22 is a unit that includes a semiconductor memory or the like and stores various types of information.

The communication I/F part 23 is a unit that communicates with an external apparatus such as the server 101. The communication I/F part 23 can notify an administrator or a person in charge of maintenance of an instruction of maintenance via a communication line 31.

The image forming apparatus 100 is communicably connected to the server 101 via the communication line 31. In addition, the server 101 is communicably connected to another apparatus 102 via the communication line 31. The server 101 can instruct the image forming apparatus 100 or the other apparatus 102 to form an image.

Figure 2:
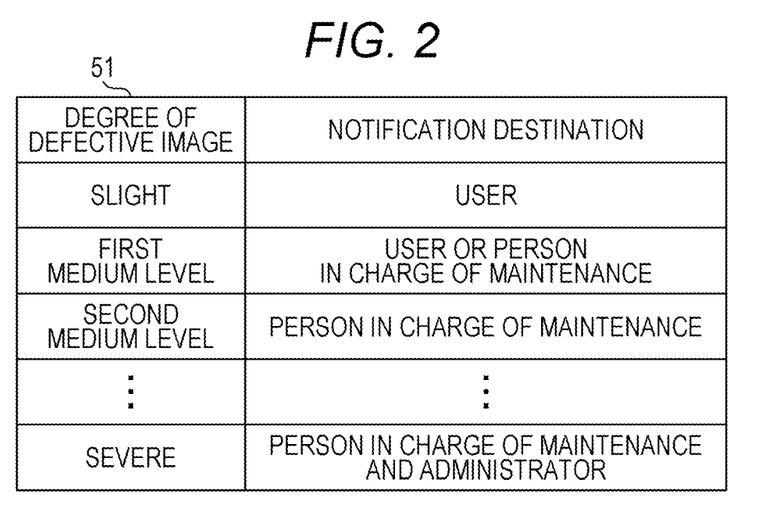
FIG. 2 is an explanatory diagram of a table chart used in the embodiment.
Figure 3:
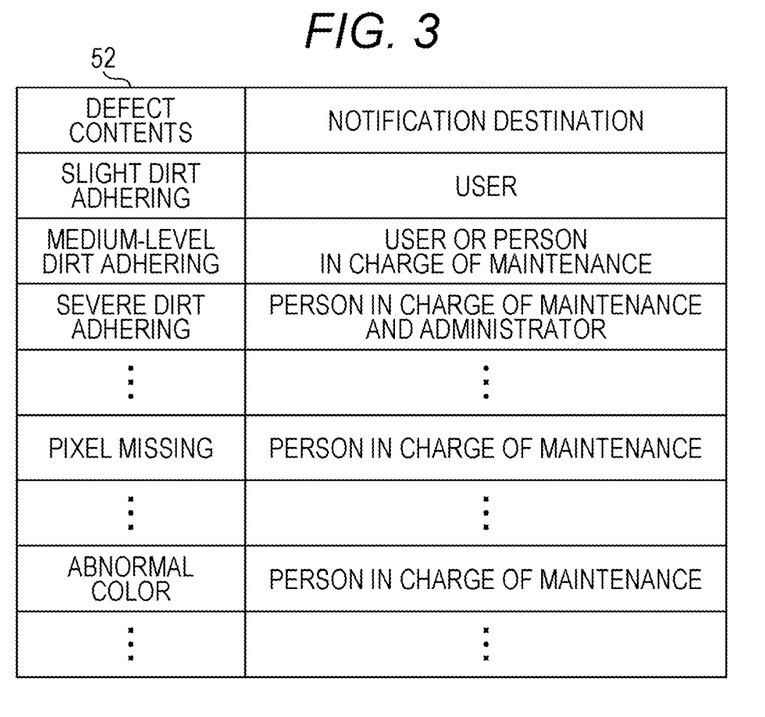
FIG. 3 is an explanatory diagram of another table chart used in the embodiment.

The storage 22 stores a control program 50, a table chart 51 (see FIG. 2), and a table chart 52 (see FIG. 3). FIG. 2 is an explanatory diagram of the table chart 51. FIG. 3 is an explanatory diagram of the table chart 52.

The control program 50 causes a central processing unit (CPU) mounted on the image forming apparatus 100 to function as the image defect detector 13, the defect notification controller 14, the authenticator 15, the character recognizer 17, and the controller 21.

As illustrated in FIG. 2, the table chart 51 represents information regarding notification destinations according to the degree of a defective image.

As illustrated in FIG. 3, the table chart 52 represents information regarding notification destinations according to defect contents.

<Operation of Image Forming Apparatus>

Figure 4:
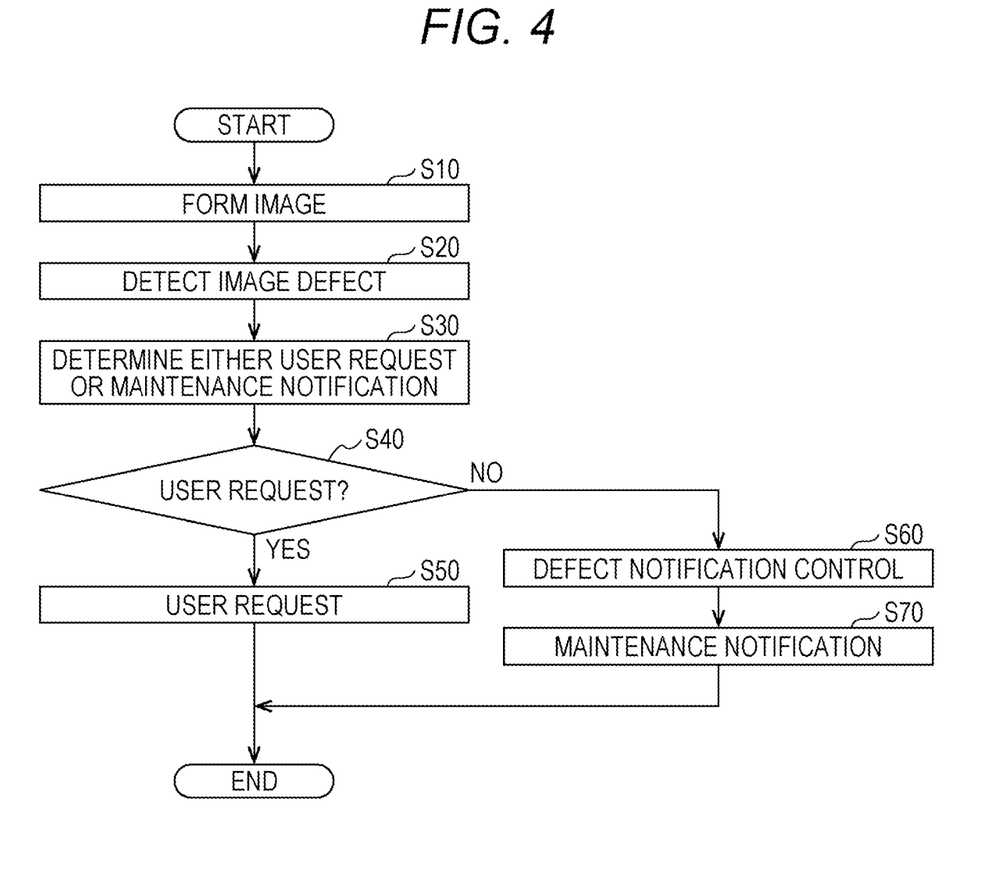
FIG. 4 is a flowchart illustrating an operation of the image forming apparatus.
Figure 5:
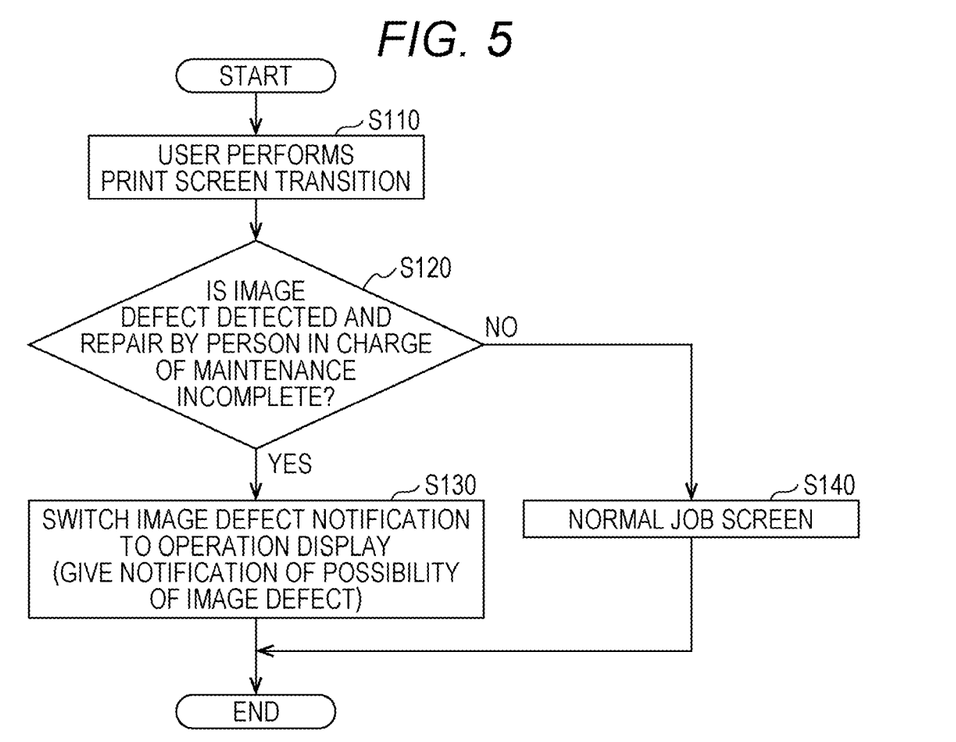
FIG. 5 is a flowchart illustrating an operation of a first example in the image forming apparatus.
Figure 6:
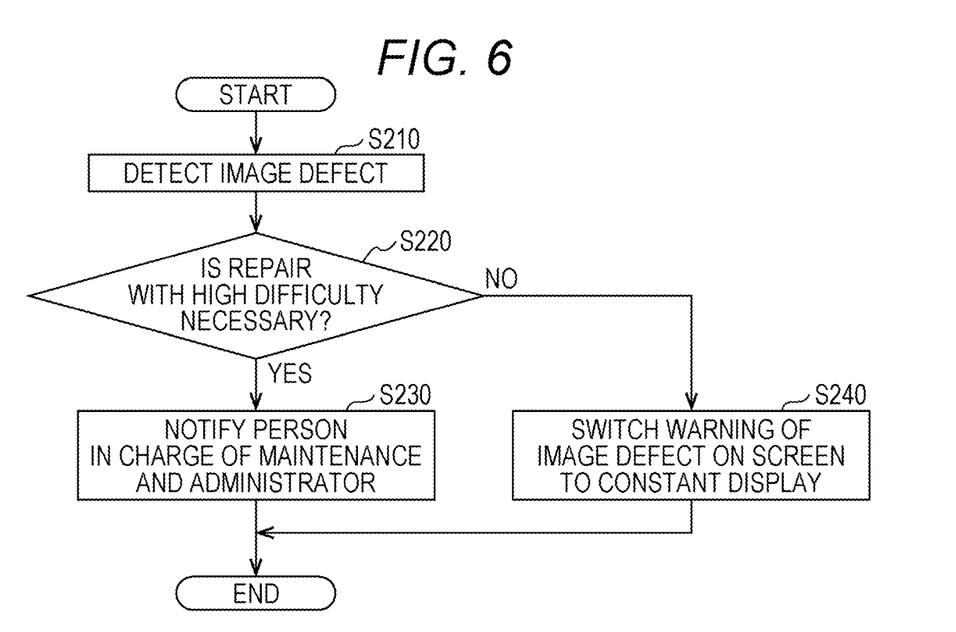
FIG. 6 is a flowchart illustrating an operation of a second example in the image forming apparatus.
Figure 7:
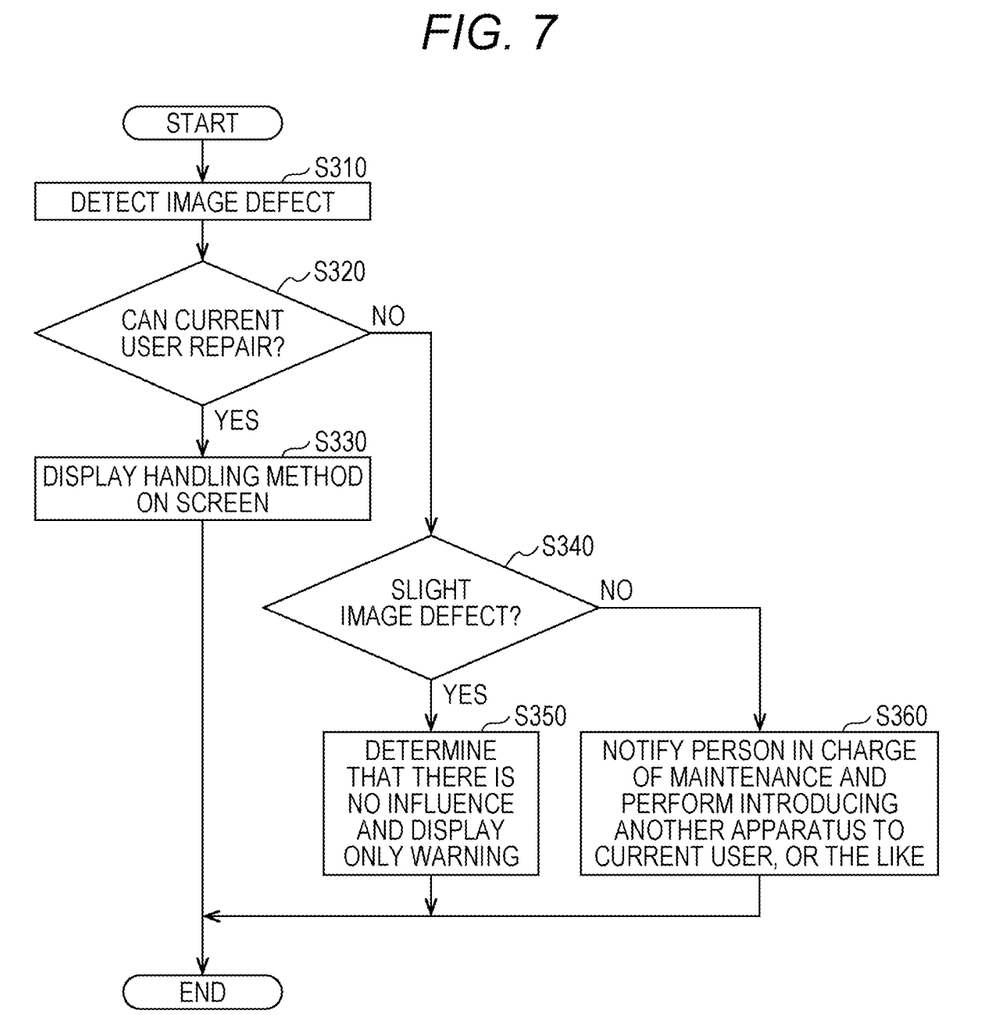
FIG. 7 is a flowchart illustrating an operation of a third example in the image forming apparatus.
Figure 8:
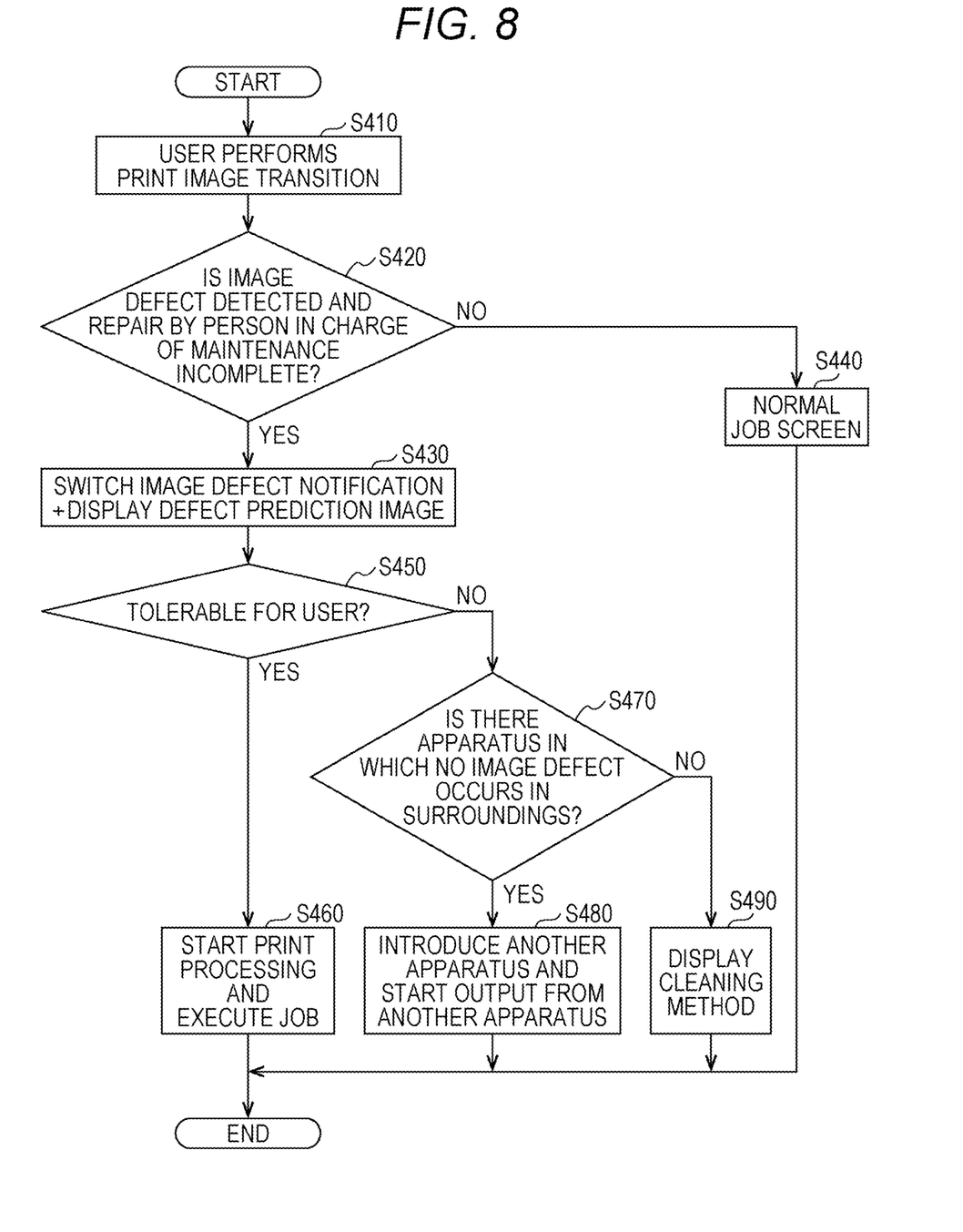
FIG. 8 is a flowchart illustrating an operation of a fourth example in the image forming apparatus.
Figure 9:
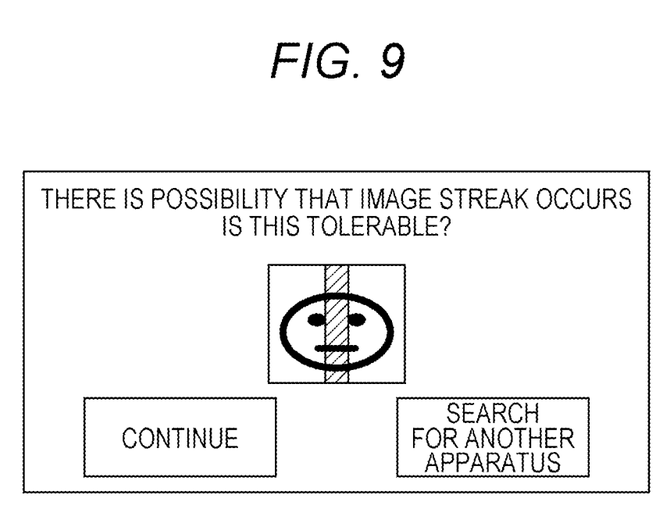
FIG. 9 is a diagram illustrating an example of a defect prediction image.

Hereinafter, the operation of the image forming apparatus 100 will be described with reference to FIGS. 4 to 8. FIG. 4 is a flowchart illustrating an operation of the image forming apparatus 100. FIG. 5 is a flowchart illustrating an operation of a first example in the image forming apparatus 100. FIG. 6 is a flowchart illustrating an operation of a second example in the image forming apparatus 100. FIG. 7 is a flowchart illustrating an operation of a third example in the image forming apparatus 100. FIG. 8 is a flowchart illustrating an operation of a fourth example in the image forming apparatus 100. FIG. 9 is a diagram illustrating an example of a defect prediction image.

As illustrated in FIG. 4, the image forming apparatus 100 first forms a print image on the print medium (step S10), and then detects a defect in the image formed on the print medium (step S20).

After step S20, the defect notification controller 14 of the image forming apparatus 100 determines either a maintenance request or a maintenance notification according to a predetermined condition (step S30). Here, the "maintenance request" means to request the user to select a determination as to whether or not maintenance is necessary. Further, the "maintenance notification" means to notify the person in charge of maintenance that maintenance is necessary. Note that the "condition" is defined by the control program 50, the table chart 51 (see FIG. 2), the table chart 52 (see FIG. 3), and the like. In step S30, the defect notification controller 14 can instruct the controller 21 on the defect notification destination. In a case where the defect notification controller 14 does not switch the defect notification destination, the defect notification destination is a default notification destination, and in a case where the defect notification controller 14 switches the defect notification destination, the defect notification destination is a notification destination on which an instruction is given by the defect notification controller 14.

The controller 21 of the image forming apparatus 100 determines whether or not to make a user request (step S40). When it is determined in step S40 to make a user request (when it is "Yes"), the image forming apparatus 100 displays, on the operation display 11, a screen requesting the user to select a determination as to whether or not maintenance is necessary and receives the user request (step S50). On the other hand, when it is determined in step S40 not to make a user request (when it is "No"), the image forming apparatus 100 performs defect notification control (step S60) and performs maintenance notification to notify the person in charge of maintenance that maintenance is necessary (step S70).

First Example

The image forming apparatus 100 can perform control to switch the notification destination to the display (operation display 11) and give a notification of image defect information or maintenance information when it is a state where the occurrence of an image defect is detected and the maintenance is not completed even after a lapse of a certain period of time after giving a maintenance instruction (notification about maintenance) to the person in charge of maintenance and/or the administrator. In order to implement such control, the image forming apparatus 100 executes, for example, processing of a first example illustrated in FIG. 5.

As illustrated in FIG. 5, the user operates the operation display 11 of the image forming apparatus 100 to perform a print screen transition (step S110). Here, a description will be given assuming that the "print screen transition" is a screen operation for selecting any job from a job list for which the image forming apparatus 100 is instructed on printing by the user. After step S110, the image forming apparatus 100 determines whether it is a state where the occurrence of an image defect is detected and repair (maintenance) by the person in charge of maintenance is in an incomplete state (step S120). When it is determined in step S120 that the repair is in an incomplete state (when it is "Yes"), the image forming apparatus 100 switches the notification of the image defect to the operation display 11 (step S130). That is, the user is notified that an image defect has occurred. On the other hand, when it is determined in step S120 that the repair is not in an incomplete state (when it is "No"), the image forming apparatus 100 displays a normal job screen on the operation display 11 (step S140).

By executing the processing of the first example, the image forming apparatus 100 can solve, for example, the following problems of the conventional technology described in JP 2001-202224 A. For example, the conventional technology described in JP 2001-202224 A has a problem that, in a case where a maintenance instruction (notification about maintenance) is given only to the person in charge of maintenance and/or the administrator without being given to the user, there is a case where the user who uses the image forming apparatus does not notice the occurrence of an image defect until after execution of a job. On the other hand, by executing the processing of the first example, the image forming apparatus 100 can switch the destination of the notification about maintenance and give a notification of the image defect information or the maintenance information on the operation display 11 when the maintenance is not completed even after a lapse of a certain period of time after giving the maintenance instruction. Thus, the user can grasp the image defect state of the image forming apparatus 100.

Second Example

When the occurrence of an image defect is detected, the image forming apparatus 100 can perform control such that the destination of notification is switched from the user to the person in charge of maintenance and/or the administrator, and the maintenance information is output to the notification destination via the communication I/F part 23, so as not to give the notification about maintenance to the user of the next use when a cause of the image defect needs repair (maintenance) with high difficulty. In order to implement such control, the image forming apparatus 100 executes, for example, processing of a second example illustrated in FIG. 6.

As illustrated in FIG. 6, the image forming apparatus 100 detects occurrence of an image defect (step S210). After step S210, the image forming apparatus 100 determines whether or not repair (maintenance) with high difficulty is necessary (step S220). When it is determined in step S220 that the repair with high difficulty is necessary (when it is "Yes"), the image forming apparatus 100 notifies the person in charge of maintenance and/or the administrator that the repair with high difficulty is necessary (step S230). On the other hand, when it is determined in step S220 that the repair with high difficulty is not necessary (when it is "No"), the image forming apparatus 100 switches a warning of occurrence of the image defect on the screen of the operation display 11 to constant display (step S240). That is, the notification about maintenance is given to the user for next use.

By executing such processing of the second example, the image forming apparatus 100 can solve, for example, the following problems of the conventional technology described in JP 2019-177525 A. For example, the conventional technology described in JP 2019-177525 A has a problem that, in a case where a maintenance instruction (notification about maintenance) is given only to the user without being given to the person in charge of maintenance and/or the administrator, since the user cannot perform a repair operation with high difficulty, a notification to the user every time annoys the user, that is, makes the user feel uncomfortable. On the other hand, by executing the processing of the second example, the image forming apparatus 100 can output the maintenance information to the person in charge of maintenance and/or the administrator via the communication I/F part 23 in a case where the difficulty of repair is high. Thus, the image forming apparatus 100 can cause the person in charge of maintenance and/or the administrator who can handle the image defect to perform repair, thereby eliminating the occurrence of the image defect at an early stage.

Third Example

In a case where the occurrence of an image defect is detected, the image forming apparatus 100 can perform control so as to determine an optimal destination of response to a defective image according to skills of an individual user and a status of the defective image. In order to implement such control, the image forming apparatus 100 executes, for example, processing of a third example illustrated in FIG. 7.

As illustrated in FIG. 7, the image forming apparatus 100 detects occurrence of an image defect (step S310). After step S310, the image forming apparatus 100 determines whether or not the current user can perform repair (maintenance) (step S320). When it is determined in step S320 that the current user can be repaired (maintained) (when it is "Yes"), the image forming apparatus 100 displays a handling method (repair method) on the screen of the operation display 11 (step S330). On the other hand, when it is determined in the determination in step S320 that the current user cannot perform repair (maintenance) (when it is "No"), the image forming apparatus 100 determines whether the detected image defect is a slight image defect (step S340). When it is determined in step S340 that the detected image defect is a slight image defect (when it is "Yes"), the image forming apparatus 100 determines that there is no influence and displays only a warning on the screen of the operation display 11 (step S350). On the other hand, when it is determined in step S340 that the detected image defect is not a slight image defect (when it is "No"), the image forming apparatus 100 notifies the person in charge of maintenance and/or the administrator and performs processing such as introducing another apparatus to the current user (step S360).

By executing the processing of the third example, for example, the image forming apparatus 100 can solve the following problems of the conventional technology described in JP 2001-202224 A and the conventional technology described in JP 2019-177525 A. For example, the conventional technology described in JP 2001-202224 A has a problem that, in a case where a maintenance instruction (notification about maintenance) is given only to the person in charge of maintenance and/or the administrator without being given to a user, a defective image is generated until the repair (maintenance) is handled. Further, for example, the conventional technology described in JP 2019-177525 A has a problem that, in a case where a maintenance instruction (notification about maintenance) is given only to the user without being given to the person in charge of maintenance and/or the administrator, since the user cannot perform a repair operation with high difficulty, a notification to the user every time annoys the user, that is, makes the user feel uncomfortable. On the other hand, by executing the processing of the third example, the image forming apparatus 100 can determine an optimal destination of response to a defective image according to skills of an individual user and a status of the image defect. In a case where the user cannot cope with a defective image, such an image forming apparatus 100 can determine an optimal destination of response to a defective image according to various factors such as skills of an individual user and an availability status of the person in charge of maintenance, and thus it is possible to suppress a burden on the user and the person in charge of maintenance as much as possible.

Fourth Example

In a case where repair (maintenance) is incomplete even though the occurrence of an image defect has been detected in a print job on which an instruction is given in the past and the person in charge of maintenance and/or the administrator has been notified of information thereof, when an instruction on a print job is further given by the current user, the image forming apparatus 100 can perform control to display an optimum screen in accordance with the situation of the image defect, or the like. In order to implement such control, the image forming apparatus 100 executes, for example, processing of a fourth example illustrated in FIG. 8.

As illustrated in FIG. 8, the user operates the operation display 11 of the image forming apparatus 100 to perform the print screen transition for specifying a print image (step S410). After step S410, the image forming apparatus 100 determines whether or not it is a state where the occurrence of an image defect is detected and repair (maintenance) by the person in charge of maintenance is in an incomplete state (step S420). When it is determined in step S420 that the repair is in an incomplete state (when it is "Yes"), the image forming apparatus 100 switches the notification of the image defect to the operation display 11 and displays the defect prediction image (see FIG. 9) on the operation display 11 (step S430).

FIG. 9 is a diagram illustrating an example of the defect prediction image. Here, the "defect prediction image" is an image representing a defect predicted to occur at the time of printing. The example illustrated in FIG. 9 indicates that there is a possibility that an image streak may occur when printing is performed. In addition, a "continue" button and a "search for another apparatus" button are added to the defect prediction image illustrated in FIG. 9. The "continue" button is a button for allowing the user to select to continue the print job. Further, the "search for another apparatus" button is a button for allowing the user to select to search for another image forming apparatus (another apparatus) and cause the another apparatus to execute the print job.

Returning to FIG. 8, when it is determined that the repair is not in an incomplete state in the determination in step S420 described above (when it is "No"), the image forming apparatus 100 displays a normal job screen on the operation display 11 (step S440).

After step S430 described above, the image forming apparatus 100 determines whether or not the degree of defect of the defect prediction image is a degree tolerable for the user (step S450). When it is determined in the determination in step S450 that the degree of defect of the defect prediction image is a degree tolerable for the user (when it is "Yes"), the image forming apparatus 100 starts the print processing and executes the job (step S460). On the other hand, when it is determined in the determination in step S450 that the degree of defect of the defect prediction image is not the degree tolerable for the user (when it is "No"), the image forming apparatus 100 determines whether or not there is another image forming apparatus (another apparatus) in which no image defect occurs in the surroundings (step S470). When it is determined in step S470 that there is another apparatus in which no image defect occurs in the surroundings (when it is "Yes"), the image forming apparatus 100 displays a list of other apparatuses in which no image defect occurs in the surroundings on the operation display 11, introduces another apparatus to the user, and starts outputting (forming) an image from the another apparatus (step S480). On the other hand, when it is determined in step S470 that there is no other apparatus in which no image defect occurs in the surroundings (when it is "No"), the image forming apparatus 100 displays a cleaning method on the operation display 11 (step S490) and prompts the user to clean the image forming apparatus 100.

By executing such processing of the fourth example, the image forming apparatus 100 can solve, for example, the following problems of the conventional technology described in JP 2001-202224 A. For example, the conventional technology described in JP 2001-202224 A has a problem that the user executes a print job without noticing occurrence of an image defect, and thus a defective image may be output. When the defective image is output, resources are wastefully consumed, so that the user feels that an unnecessary job has been executed, and the user feels uncomfortable. On the other hand, by executing the processing of the fourth example, the image forming apparatus 100 can perform control so as to display an optimum screen in accordance with the situation of an image defect or the like. Such an image forming apparatus 100 can switch a preferred notification destination of an image defect to the operation display 11. Further, the image forming apparatus 100 can present not only the notification of the image defect but also a defect prediction image (see FIG. 9) that can occur at the time of executing the job to the user. Further, the image forming apparatus 100 can switch the control by determination of the user by presenting the defect prediction image (see FIG. 9) in step S430. For example, the image forming apparatus 100 can switch whether to cause the current image forming apparatus 100 to continue the print job or cause another image forming apparatus to execute the print job by determination of the user. In a case where the current image forming apparatus 100 is caused to continue the print job, the current image forming apparatus 100 is caused to execute the print job as it is. In a case where the current image forming apparatus 100 is not caused to continue the print job, a list of other apparatuses in which an image defect does not occur in the surroundings is displayed on the operation display 11, and the other apparatuses are introduced to the user. Alternatively, in this case, a cleaning method is displayed on the operation display 11 to prompt the user to clean the image forming apparatus 100. Note that, in a case where the cleaning method is displayed, the user can perform the cleaning without worrying about the difficulty of repair (maintenance) that can be handled. In addition, the processing of the fourth example can be changed depending on the cause of an image defect and an apparatus in the surroundings.

<Main Characteristics of Image Forming Apparatus>

The image forming apparatus 100 according to the present embodiment mainly has the following characteristics.

(1) As illustrated in FIG. 1, the image forming apparatus 100 according to the present embodiment includes an image former 12 that forms a print image, an image defect detector 13 that detects a defect of an image formed on a print medium by the image former 12, an operation display 11 (display) capable of prompting a user to perform maintenance, a communication I/F part 23 capable of notifying an administrator or a person in charge of maintenance of an instruction of maintenance via a communication line 31, a controller 21 capable of giving an instruction to the operation display 11 and the communication I/F part 23, and a defect notification controller 14 capable of instructing the controller 21 on a defect notification destination.

Such an image forming apparatus 100 according to the present embodiment can suitably give a notification about maintenance. For example, the image forming apparatus 100 can switch the notification destination of the state of the image defect to either the user or the person in charge of maintenance (service person) according to the situation or case. Thus, it is possible to reduce unnecessary printing errors while implementing optimal response to the image defect.

(2) Preferably, a configuration is employed in which the image defect detector 13 is capable of making a determination on the basis of the state of an image output from the image former 12.

In such an image forming apparatus 100 according to the present embodiment, the image defect detector 13 can grasp the state of the image defect on the basis of an image acquired by a camera or the like.

(3) A configuration may be employed in which the image defect detector 13 is capable of making a determination on the basis of information input from the operation display 11.

In such an image forming apparatus 100 according to the present embodiment, the image defect detector 13 can grasp the state of the image defect on the basis of information input by the user.

(4) Preferably, a configuration is employed in which the defect notification controller 14 is capable of switching a notification destination according to a time elapsed after the instruction is given by the controller 21.

In such an image forming apparatus 100 according to the present embodiment, the defect notification controller 14 can switch the notification destination according to the elapsed time after the first notification about maintenance (maintenance instruction) is given. Therefore, for example, when a certain period of time has elapsed after the notification about maintenance is given to the person in charge of maintenance (service person), the notification about maintenance can also be given to the user.

(5) Preferably, a configuration is employed in which the defect notification controller 14 is capable of switching a notification destination in a case where a defect detected by the image defect detector 13 is not resolved after the instruction is given by the controller 21.

In such an image forming apparatus 100 according to the present embodiment, the defect notification controller 14 can switch the notification destination depending on whether the defect of which a notification was given has been resolved. Therefore, for example, when the repair (maintenance) is not completed after the notification about maintenance is given to the person in charge of maintenance (service person), the notification about maintenance can also be given to the user. Alternatively, the state of the image forming apparatus 100 can be presented and grasped by the user before execution of the job.

(6) Preferably, a configuration is employed in which a storage 22 that stores information including a table chart 51 related to a notification destination according to the degree of a defective image is included, and the defect notification controller 14 is capable of switching the notification destination according to a defective image determination result by the storage 22 and the image defect detector 13.

In such an image forming apparatus 100 according to the present embodiment, the defect notification controller 14 can switch the notification destination depending on the degree of defect of the defective image. Therefore, for example, in a case where the degree of defect of the defective image is slight, the processing can be arbitrarily switched such as not giving the notification about maintenance to the person in charge of maintenance, or selectively giving the notification about maintenance as necessary to the user next time, or the like.

(7) Preferably, a configuration is employed in which the storage 22 that stores information including a table chart 52 related to a notification destination according to a defect content is included, and the defect notification controller 14 is capable of switching the notification destination according to results of the storage 22 and the image defect detector 13.

In such an image forming apparatus 100 according to the present embodiment, the defect notification controller 14 can switch the notification destination according to defect notification setting contents. Therefore, for example, in a case where the notification destination setting is "slight contamination of the end portion", it is possible to give the notification about maintenance to the user, and not to give the notification about maintenance to the person in charge of maintenance.

(8) Preferably, a configuration is employed in which a document reader 16 that reads a document and a character recognizer 17 that recognizes a character content of a document are included, and the defect notification controller 14 is capable of switching a notification destination according to results of the character recognizer 17 and the image defect detector 13.

In such an image forming apparatus 100 according to the present embodiment, the defect notification controller 14 can switch the notification destination according to the document type (read by OCR). Therefore, for example, when it is determined that the document is not an important document such as an invoice, the control can be switched so as not to give the notification about maintenance to the user depending on the degree of the image defect.

(9) Preferably, a configuration is employed in which an authenticator 15 that recognizes user information and the storage 22 that holds user information are included, and the defect notification controller 14 is capable of switching a notification destination according to results of the authenticator 15, the storage 22, and the image defect detector 13.

In such an image forming apparatus 100 according to the present embodiment, the authenticator 15 acquires user information by a reader such as an IC card reader or a magnetic card reader and compares the acquired user information with registered user information registered in advance and authenticates the user. Then, the image forming apparatus 100 can switch the notification destination according to the result of the image defect detector 13 for each user authenticated by the authenticator 15 by the defect notification controller 14. Therefore, for example, in a case where the current user is a user who can repair the image forming apparatus 100, the control can be switched so as to give the notification about maintenance to the user without giving the notification about maintenance to the person in charge of maintenance.

(10) Preferably, a configuration is employed in which, in addition to a determination function of the image forming apparatus itself, the image forming apparatus 100 according to the present embodiment includes an input operation function that displays a defect prediction image for a finish defect by the user.

The image forming apparatus 100 according to the present embodiment can switch the control by determination of the image forming apparatus itself and determination of the user. Therefore, for example, it is possible to cause the user to determine whether or not the degree of defect of the image defect is slight to the degree that it is negligible and cause the current image forming apparatus 100 to continue the print job or cause another image forming apparatus to execute the print job. Further, the image forming apparatus 100 may update the user's tolerable level (for example, the level of whether or not the degree of defect of the defect prediction image used in the determination in step S450 in FIG. 8 is tolerable for the user) according to the user's tolerance information (for example, information indicating which of the "continue" button and the "search for another apparatus" button illustrated in FIG. 9 has been selected).

(11) Preferably, a configuration is employed in which, when detecting an occurrence of an image defect by the defect notification controller 14 and notifying the user of the occurrence of the image defect, the image forming apparatus 100 according to the present embodiment is capable of displaying a defect prediction image detected by the image defect detector 13 on the operation display 11 in advance at a time when executing a job by the user.

When detecting the occurrence of an image defect and notifying the user of the occurrence of the image defect, the image forming apparatus 100 according to the present embodiment can display the defect prediction image (see FIG. 9) generated at the time when executing the job on the operation display 11 together with the notification. Note that, at this time, the image forming apparatus 100 may not request the user to select the "proceed" button and the "search for another apparatus" button illustrated in FIG. 9.

(12) Preferably, a configuration is employed in which the image forming apparatus 100 according to the present embodiment includes the storage 22 that stores information including the table chart 51 related to a notification destination according to the degree of a defective image, and the table chart 51 of the storage 22 is rewritten in a case where the user tolerates the defect prediction image.

Such an image forming apparatus 100 according to the present embodiment can rewrite the table chart 51 of the storage 22 in a case where the user tolerates the defect prediction image. In such an image forming apparatus 100, for example, in a case where the user tolerates a defect prediction image, the defect determination value is changed, and the controller 21 can automatically execute the print job.

(13) Preferably, the image forming apparatus 100 according to the present embodiment includes a storage 22 capable of storing a confirmation result of the defect prediction image for each user.

Such an image forming apparatus 100 according to the present embodiment can store the confirmation result of the defect prediction image in the storage 22 for each user. For example, in a case where the degree of defect of an image defect is slight to the degree that it is negligible, such an image forming apparatus 100 may not request the user for input every time.

(14) Preferably, a configuration is employed in which the image forming apparatus 100 according to the present embodiment is capable of storing and reading a confirmation result of the defect prediction image in and from the server 101 that is capable of aggregating information of the defect prediction image via the communication I/F part 23.

Such an image forming apparatus 100 according to the present embodiment can store the confirmation result of the defect prediction image in the server 101. In such an image forming apparatus 100, for example, a control operation corresponding to each user can be shared with another apparatus 102.

(15) Preferably, a configuration is employed in which the image forming apparatus 100 according to the present embodiment is capable of acquiring a defective image determination criterion of the user from the server 101 that aggregates confirmation results of the defect prediction images, and the defect notification controller 14 is capable of switching a notification destination according to a user defective image determination result of the server 101.

The image forming apparatus 100 according to the present embodiment can switch notification destinations according to defective image determination results of a plurality of users obtained by aggregating determination information of the plurality of users in the server 101. Such an image forming apparatus 100 can switch a determination threshold, for example, according to an input content of a determination result by the user. For example, in a case where three or more persons determine that there is no influence, it is possible not to determine that it is an image defect and to switch the control so as not to give the notification about maintenance to the user. Such an image forming apparatus 100 can share various types of information (for example, defective image determination reference information of each user, and the like) with another apparatus 102.

(16) Preferably, the defect prediction image is generated on the basis of an image acquired by the image defect detector 13.

Such an image forming apparatus 100 according to the present embodiment can display an actual image (scanner image) acquired by the image defect detector 13 or the defect prediction image generated on the basis of an image of input information of the user on the operation display 11.

(17) Preferably, the defect notification controller 14 cancels all notifications and histories when an occurrence of an image defect of which the user is notified by the operation display 11 or an occurrence of an image defect of which the person in charge of maintenance and/or the administrator is notified by the communication I/F part 23 is eliminated.

When the image defect is eliminated, the image forming apparatus 100 according to the present embodiment can cancel all notifications and histories. For example, in a case where the image forming apparatus 100 notifies the user of the occurrence of an image defect and notifies the person in charge of maintenance and/or the administrator of the occurrence of the image defect, and when the occurrence of the image defect is eliminated by repair of either one of the user and the person in charge of maintenance, the history of the notification to the other can be canceled.

(18) As illustrated in FIG. 4, the image forming method according to the present embodiment includes forming a print image by an image former 12, detecting a defect of an image formed on a print medium by the image forming, and determining either of requesting a user to perform maintenance or giving a notification of maintenance in which it is possible to notify an administrator or a person in charge of maintenance of an instruction of maintenance via a communication line 31, in which it is possible to instruct a controller 21 on a defect notification destination in the determining.

Such an image forming method according to the present embodiment can suitably give a notification about maintenance. For example, the notification destination of the state of the image defect can be switched to either the user or the person in charge of maintenance (service person) according to the situation or case. Thus, it is possible to reduce unnecessary printing errors while implementing optimal response to the image defect.

As described above, with the image forming apparatus 100 according to the present embodiment, it is possible to suitably give a notification about maintenance.

Note that the present invention is not limited to the above-described embodiment, and various changes and modifications can be made without departing from the gist of the present invention.

For example, the above-described embodiment has been described in detail for easy understanding of the gist of the present invention. Thus, the present invention is not necessarily limited to one including all the components described. Further, in the present invention, another component can be added to a certain component, or a part of the components can be changed to other components. Further, in the present invention, a part of components can be eliminated.

For example, the image forming apparatus 100 can have a configuration in which the controller 21 and the defect notification controller 14 are integrated. In this case, the controller 21 integrated with the defect notification controller 14 exchanges an instruction such as switching of a notification destination inside the controller 21. Then, in a case where the notification destination is the administrator and/or the person in charge of maintenance, the controller 21 notifies the administrator and/or the person in charge of maintenance of a notification about maintenance from the communication I/F part 23 via the communication line 31. Further, in a case where the notification destination is the user, the controller 21 displays the notification about maintenance on the operation display 11.

In addition, for example, when switching the notification destination, the image forming apparatus 100 may give a notification of the notification destination before switching that the notification destination has been switched.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus, comprising:
an image former that forms a print image;
an image defect detector that detects a defect of an image formed on a print medium by the image former;
a communication I/F part capable of giving a notification of an instruction of maintenance via a communication line;
a storage that stores a plurality of notification destinations to be notified of maintenance; and
a controller capable of giving, using the communication I/F part, a notification of an instruction of maintenance to at least one of the notification destinations selected according to a defect content detected by the image defect detector;
wherein the storage stores information including a table chart related to a notification destination according to a degree of the defect of the image, and wherein the controller is capable of switching the notification destination according to the degree of defect of the image determination by the storage and the image defect detector.

2. The image forming apparatus according to claim 1, wherein the image defect detector is capable of making a determination on a basis of a state of an image output from the image former.

3. The image forming apparatus according to claim 1, wherein
the display is formed as an operation display to which an input function is added, and
the image defect detector is capable of making a determination on a basis of information input from the operation display.

4. The image forming apparatus according to claim 1, wherein the controller is capable of switching a notification destination according to a time elapsed after the instruction of maintenance is given.

5. The image forming apparatus according to claim 4, wherein the controller is capable of switching a notification destination in a case where a defect detected by the image defect detector is not resolved after the instruction of maintenance is given.

6. The image forming apparatus according to claim 1, wherein the storage stores information including a table chart related to a notification destination according to a defect content, and wherein the controller is capable of switching the notification destination according to results of the storage and the image defect detector.

7. The image forming apparatus according to claim 1, further comprising:
a document reader that reads a document; and
a character detector that recognizes a character content of a document, wherein
the controller is capable of switching a notification destination according to results of the image defect detector and the character detector.

8. The image forming apparatus according to claim 1, further comprising:
a user detector that recognizes user information;
wherein the storage holds user information, and wherein
the controller is capable of switching a notification destination according to results of the image defect detector and the user detector and the storage.

9. The image forming apparatus according to claim 1, further comprising, in addition to a determination function of the image forming apparatus itself, an input operation function that displays a defect prediction image for a finish defect by the user.

10. The image forming apparatus according to claim 1, wherein
when detecting an occurrence of an image defect by the controller and notifying the user of the occurrence of the image defect, the image forming apparatus is capable of displaying a defect prediction image detected by the image defect detector on the display in advance at a time when executing a job by the user.

11. The image forming apparatus according to claim 10, wherein the storage stores information including a table chart related to a notification destination according to a degree of a defective image, wherein
the table chart of the storage is rewritten in a case where the user tolerates the defect prediction image.

12. The image forming apparatus according to claim 10, wherein the defect prediction image is generated on a basis of an image acquired by the image defect detector.

13. The image forming apparatus according to claim 10, wherein the storage is capable of storing a confirmation result of the defect prediction image for each user.

14. The image forming apparatus according to claim 10, wherein
the image forming apparatus is capable of storing and reading a confirmation result of the defect prediction image in and from a server that is capable of aggregating information of the defect prediction image via the communication I/F part.

15. The image forming apparatus according to claim 14, wherein
the image forming apparatus is capable of acquiring a defective image determination criterion of the user from the server that aggregates confirmation results of the defect prediction images, and
the controller is capable of switching a notification destination according to a user defective image determination result of the server.

16. The image forming apparatus according to claim 1, wherein
the controller cancels all notifications and histories when an occurrence of an image defect of which a notification is given by the display or an occurrence of an image defect of which a notification is given by the communication I/F part is eliminated.

17. An image forming method, comprising:
forming a print image by an image former;
detecting a defect of an image formed on a print medium by the image forming; and
notifying an instruction of maintenance to at least one of a plurality of notification destinations stored on a storage;
wherein the notification destination is selected according to a content of the detected defect;
wherein the storage stores information including a table chart related to a notification destination according to a degree of the defect of the image, and wherein a controller is capable of switching the notification destination according to the degree of defect of the image determination by the storage and the image defect detector.

* * * * *